(12) United States Patent
Ono et al.

(10) Patent No.: US 6,266,081 B1
(45) Date of Patent: *Jul. 24, 2001

(54) DIGITAL IMAGE DATA STORAGE, DATA TRANSFER AND DATA BROADCAST APPARATUS AND METHOD

(75) Inventors: Tadashi Ono, Kyoto; Youichi Amano, Osaka; Hiroyuki Uenaka, Akashi; Akira Iketani, Higashiosaka; Masakazu Nishino, Kashiwara; Yuji Fujiwara, Nishinomiya; Tatsuro Juri, Osaka, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,350

(22) Filed: Feb. 19, 1997

(30) Foreign Application Priority Data

Mar. 14, 1996 (JP) .................................................. 8-058106
Aug. 29, 1996 (JP) .................................................. 8-227281

(51) Int. Cl.[7] .............................................................. G06K 9/00
(52) U.S. Cl. .............................................. 348/97; 348/459
(58) Field of Search .................................... 348/417, 427, 348/451, 448, 628, 459, 663, 394, 446, 409, 415, 416, 699, 700, 701, 97; 386/95, 111, 121; 382/232, 233, 235, 236, 238, 239, 244, 248, 250, 251, 252, 253, 278, 307

(56) References Cited

U.S. PATENT DOCUMENTS

| | | | |
|---|---|---|---|
| 4,761,686 | 8/1988 | Willis . | |
| 4,924,305 | * 5/1990 | Nakagawa et al. | 348/451 |
| 4,941,045 | * 7/1990 | Birch | 348/448 |
| 5,010,401 | * 4/1991 | Murakami et al. | 348/417 |
| 5,063,445 | * 11/1991 | Nishizawa et al. | 348/427 |
| 5,170,248 | * 12/1992 | Min | 348/628 |
| 5,243,422 | * 9/1993 | Owashi et al. | 348/459 |
| 5,305,115 | 4/1994 | Takahashi et al. . | |
| 5,325,186 | * 6/1994 | Ishizuka et al. | 348/663 |
| 5,329,309 | * 7/1994 | Dorricott et al. | 348/446 |
| 5,329,317 | 7/1994 | Naimpayyl et al. . | |
| 5,347,308 | 9/1994 | Wai | 348/394 |

FOREIGN PATENT DOCUMENTS

| | | | |
|---|---|---|---|
| 0294959 | 12/1983 | (EP) . | |
| 0371678 | 6/1990 | (EP) . | |
| 0536784 A2 | 4/1993 | (EP) . | |
| 0538834 A2 | 4/1993 | (EP) . | |
| 0637889 A2 | 2/1995 | (EP) . | |
| 0673169 A2 | 9/1995 | (EP) . | |
| 0696873 A2 | 2/1996 | (EP) . | |
| 0739129 A2 | 10/1996 | (EP) . | |
| 2-132984 | 5/1990 | (JP) . | |
| 5-030496A | 2/1993 | (JP) | H04N/7/133 |
| 6-141283A | 5/1994 | (JP) | H04N/5/93 |
| 6-350974A | 12/1994 | (JP) | H04N/7/01 |
| 7-212652 | 8/1995 | (JP) . | |
| 95/35628 | 12/1995 | (WO) . | |

* cited by examiner

*Primary Examiner*—Leo Boudreau
*Assistant Examiner*—Seyed Azarian
(74) *Attorney, Agent, or Firm*—Morrison & Foerster LLP

(57) ABSTRACT

A image signal processing apparatus and method for static image display are provided. Deformation at an edge of an image can be reduced by eliminating a temporal factor and vertical resolution can be retained even after data supplementation. In the process of compressing and decompressing interlace-scanned image data, one of two fields of a frame is selected by a field selector, image data is supplemented and reproduced based on the selected field data by a supplementor, and image data is outputted as a static image without deformation. As a result, more bits can be allocated for encoding by selecting and compressing one field data only and it leads to a higher quality image display. Furthermore, display deformation can be reduced by supplementing high frequency components as zero in the decompression processing.

18 Claims, 14 Drawing Sheets

DIGITAL IMAGE DATA STORAGE, DATA TRANSFER AND DATA BROADCAST APPARATUS AND METHOD

BACKGROUND OF THE INVENTION

1. Field of the Invention

The present invention relates to a digital image data storage apparatus, a digital image data transfer apparatus and a digital image data broadcast apparatus including image an data encoder and decoder.

2. Description of the Prior Art

A Conventional encoding process for interlace-scanned image data for storing and transferring is shown in FIGS. 20A and 20B. FIG. 20A is a block diagram of a process of image data compression, and FIG. 20A is a block diagram of a process of image data decompression. For compressing interlace-scanned image data, original image data should be generated line by line from each field, the composite image data is divided into N*N pixel blocks, then those blocks are encoded by the method of the Discrete Cosine Transformation (DCT), which is a two-dimensional orthogonal transformation. Usually signal energy of the image data is biased at low frequency, and it is expected that high frequency components are transformed to "0" by applying the DCT and proper quantization. Therefore, highly efficient image data compression can be achieved by nullifying those components.

However, if objects in the image data exhibit rapid motion, the first field and second field of the composite image data are less related. Therefore, non-"0" components can appear more in the high frequency range even after applying the DCT and proper quantization. The total amount of available bits allotted as bits for coding the compressed data is fixed in the encoding process, and compressing efficiency may be decreased by allotting the available bits to those non-"0" components in the high frequency range.

Therefore, in case when objects in the image data exhibit rapid motion, better compression efficiency can be achieved by applying the DCT to each field independently. For example, digital video recorders usually have a function for selecting the frame DCT or the field DCT in advance by detecting that the block data is "static block data" with less motion or "motion block data" with more motion.

However, there is a problem in the above-mentioned conventional method in case the image data with more motion is captured and displayed as static image data on a monitor.

Big gaps at the edge of an image in the horizontal direction between each field will appear in the motion block data of interlace-scanned image data as shown in FIG. 22. Therefore, if it is displayed as a static image on the monitor without any adjustment, the displayed image will be deformed at the edge. In a worst case, the original image cannot be recognized because of this deformation.

One method to settle this problem is shown in JP Laid Open Patent Application No.H5-30496. According to Application No.H5-30496, gaps are compensated for by means of sliding and matching both fields spatially in the horizontal direction for reducing the deformation.

However, spatial matching of both fields requires motion vectors between fields. Calculation of the motion vectors using hardware requires special additional circuits, which lead to cost increases. Similarly, calculation of the motion vectors using software leads to processing time increases.

SUMMARY OF THE INVENTION

The invention provides an image data processing apparatus having high quality image display capability without deformation and having high compression efficiency when displaying interlace-scanned motion block data or motion frame data as a static image.

A first aspect of the image data processing apparatus of the present invention is characterized by means for reproducing and supplementing field data of one side from field data of the other side and completing frame data by compositing a base field data and a reproduced field data during data processing for displaying data as static image.

A second aspect of the image data processing apparatus of the present invention is characterized by means for controlling the applied field data supplementation for input image data according to added inter-field motion information and means for compositing frame data as the static image. The inter-field motion information is determined by means of an inter-field differential value of each block, which, if it is larger than a set value, this block data is detected as a motion block data, whereas if it is smaller than a set value, this block data is detected as a static block data.

A third aspect of the image data processing apparatus of the present invention is characterized by means for interlacing input image data, compressing the interlaced image data, decompressing the compressed image data, supplementing interlaced field data of the decompressed image data and composing frame data of a static image. The compression is a means by which the input data are divided into blocks and transformed by the DCT. The supplementation is a means by which interlaced field data are calculated from field data from the other side A fourth aspect of the image data processing apparatus of the present invention is characterized by means for compressing original input image data by transformation. The transformation is a way to detect motion block data from input block data, calculating added value and differential value of contiguous fields, and applying the orthogonal transformation to the differential value in order to make components in the high frequency range be "0".

A fifth aspect of the image data processing apparatus of the present invention is characterized by means for decompressing compressed image data according to the inter-field motion information. The compression can use either the spatial orthogonal transformation or a spatial-temporal orthogonal transformation on input image data depending on the accompanying inter-field motion information. Furthermore, in the case of a motion block, the decompression regards the temporal components at high frequency range as "0" and applies the inverse spatial-temporal orthogonal transformation.

A sixth aspect of the image data processing apparatus of the present invention is characterized by means for controlling decompression by the accompanying motion information and the playback type information specifying that data displayed should be motion picture or static image. The inter-field motion information is information which describes block data as a motion block or a static block. The decompression is a means for applying the usual inverse spatial-temporal orthogonal transformation to motion block data in the case that the playback type information is "motion picture", and for applying the inverse spatial orthogonal transformation to one field of motion block data in order to compose frame data in the case that the playback type information is "static image".

According to these and other aspects and advantages of the invention, when decompressing and displaying the compressed interlace-scanned motion picture data as a static image, deformation of the image can be reduced by using one side of field data and supplementing with the other side of field data. Because one side of field data is used, many bits can be allotted for encoding each block in compression and better quality of image display is possible.

During decompression, temporal components in motion block data are regarded as "0", and image deformation related to motion can be reduced. Furthermore, temporal components in motion block data are regarded as being "0" in compression, and many bits can be allotted to higher use for the decompression process, resulting in a better quality image display.

DESCRIPTION OF THE PREFERRED EMBODIMENTS

Hereinafter, preferred embodiments of the present invention will be explained with reference to the drawings. In the following detailed description, the Discrete Cosine Transformation (DCT) is used for the orthogonal transformation and the Inverse Discrete Cosine Transformation (IDCT) is used for the inverse orthogonal transformation. The two-dimensional DCT means the plane DCT without a temporal factor, and the three-dimensional DCT means the plane-temporal DCT.

First Embodiment

The first embodiment of the present invention will be described with reference to FIG. 1 and FIG. 2.

Figure 1:
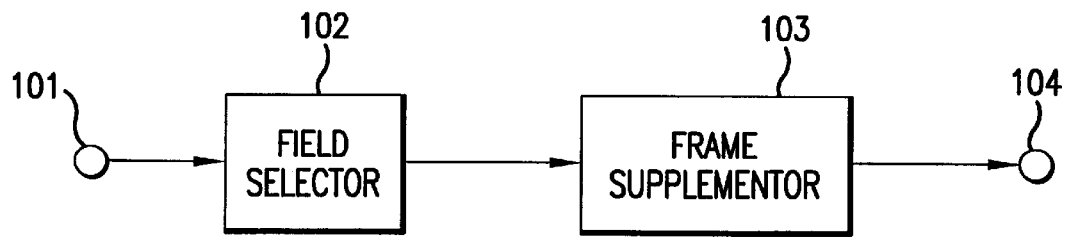
FIG. 1 is a block diagram representation of a system of a first embodiment of the present invention.

Referring first to FIG. 1, there are an image data input node 101, a field selector 102, a frame supplementor 103 and an image data output node 104.

Image data having two fields of data is inputted from the image data input node 101 and transmitted to the field selector 102, and one of the two fields of that data is selected. For example, the first field is selected in this case. The selected first field data is supplied to the frame supplementor 103, and the interlaced data (the second field data in this case) is calculated and supplemented based on the first field data by the frame supplementor 103. The two fields of data are then composited and outputted from the image data output node 104 as a static image.

Figure 2:
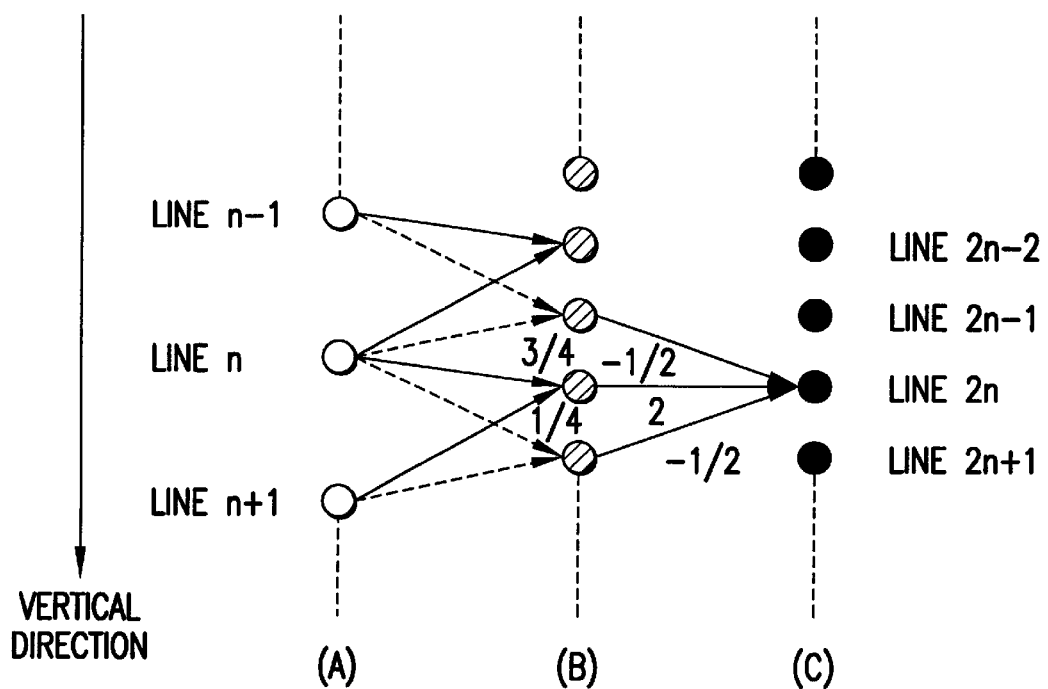
FIG. 2 shows one example process of a frame supplementor 103 of the first embodiment of the present invention.

FIG. 2 shows one example process of the frame supplementor 103 in more detail. In FIG. 2, (a) shows pixel data of supplied field data, (b) and (c) show doubled pixel data in lines from (a), and (c) will be output data.

In order to obtain pixel data of the "2n" line of (b), pixel data of the "n" line and "n+1" line of (a) are composited by the ratio of ¾:¼. In the same manner, in order to obtain pixel data of the "2n+1" line of (b), pixel data of the "n" line and "n+1" line of (a) are composited by the ratio of ¼:¾.

Next, in order to obtain pixel data of the "2n" lines of (c), pixel data of the "2n−1" line, "2n" and "2n+l" of (b) are composited by the ratio of −½:2:−½.

A feature of the series of the above pixel data transformation is that there is almost no loss in gain in a vertical direction of frequency in the range below the Nyquist rate. Therefore, when displaying the image processed by the above transformation process, the vertical resolution of the processed image is almost the same as that of the original image.

As shown above, according to this embodiment, the gap lying between two fields of data will be reduced by eliminating the temporal-based components from the playback static image, and image deformation at its edge can be reduced. In addition, the vertical resolution will not be reduced by this supplementation.

This first embodiment of the present invention is especially advantageous for capturing and displaying data of motion objects as a static image.

Second Embodiment

The second embodiment of the present invention will be described with reference to FIG. 3 to FIG. 5.

Figure 3:
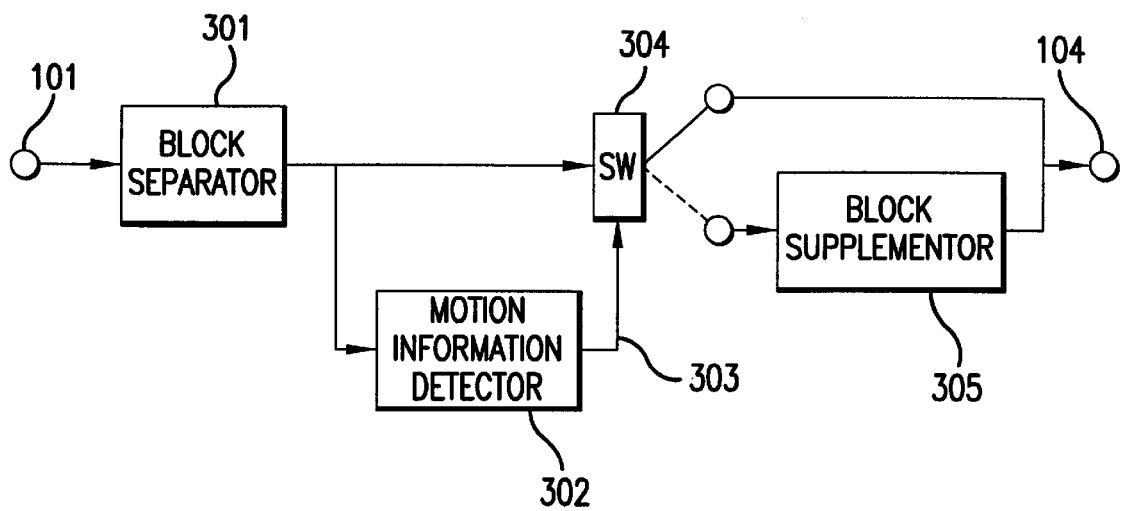
FIG. 3 is a block diagram representation of a system of a second embodiment of the present invention.

Referring first to FIG. 3, there are a block separator 301, a motion detector 302, a motion information 303, a switch 304 and a block supplementor 305. The rest of the modules in FIG. 3 are the same modules referenced above with the same numerals.

Image data inputted from the image data input node 101 is arranged into a frame line by line serially from each field and separated by an 8*8 pixel block by the block seperator 301. Block data is supplied to the switch 304 via the motion detector 302. In this process, the motion detector 302 adds a motion information, which is a flag bit data indicating block data type. If supplied block data is detected as a static block, the bit will be "0", whereas if it is detected as a motion block, the flag bit will be "1".

Figure 4:
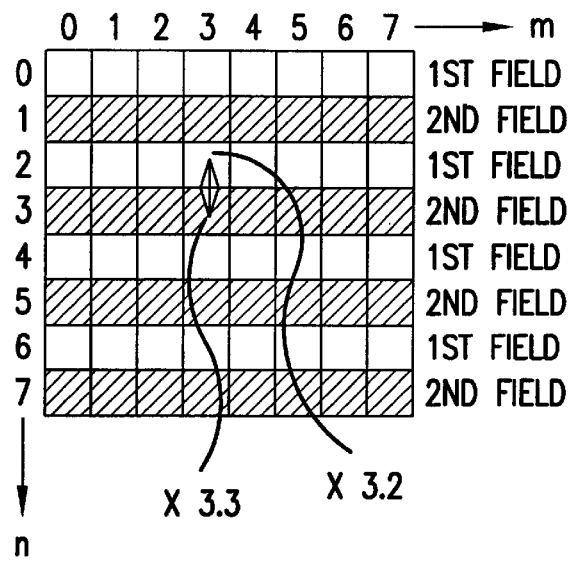
FIG. 4 shows one example process of a motion information detector 302 of the second embodiment of the present invention.
Figure 5A:
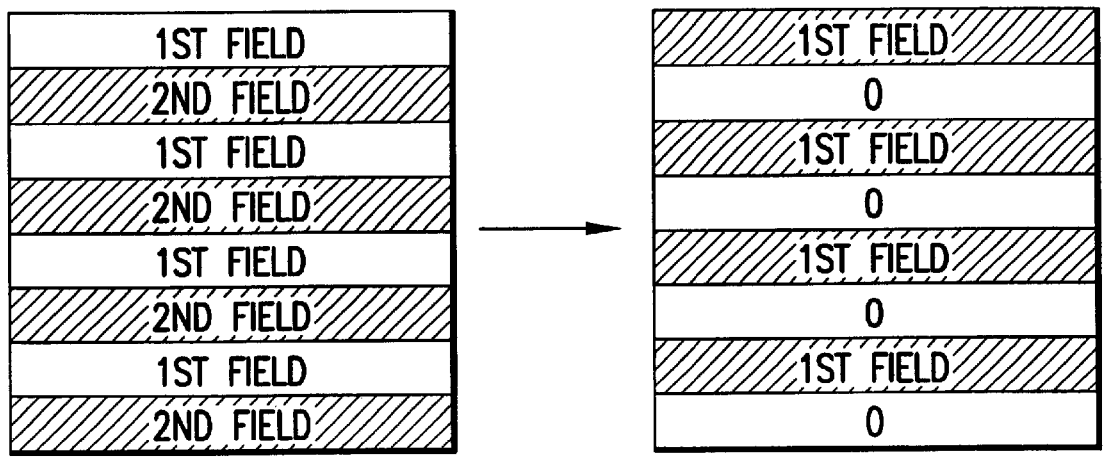
FIG. 5 shows one example process of a block supplementor 305 of the second embodiment of the present invention.

One example method of the above block data type detecting by the motion detector 302 is shown in FIG. 4. In FIG. 4, the value of each pixel in a block is represented as X(m,n). If the figure calculated by the following equation upon substitution of each pixel value is larger than a set value, the block data type is analyzed as a "motion block", if not, it is analyzed as a "static block".

Figure 5B:
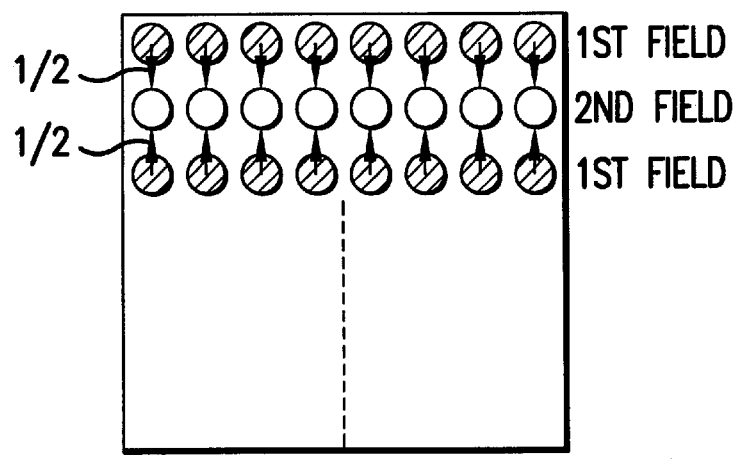

If the motion information is "1", the block data supplied to the switch 304 is switched to the image data output node 104 directly. If the motion information is "0", the block data is switched to the block supplementor 305. In the block supplementor 305 shown in FIG. 5A, the first field is selected from the frame composed of first and second fields, and the second field is interlaced. Then the second field is reproduced and supplemented based on the first field as shown in FIG. 5B. One example of field supplementation is taking the mean value of contingent pixels in the vertical direction.

The motion block data supplemented by the block supplementor 305 is supplied to the image data output node 104 and displayed as a static image.

As shown above, according to this embodiment, in case of motion block, only one side field is selected and the other side field is reproduced and supplemented based on the selected field. Therefore, the temporal-based components are eliminated from the playback static image, and image deformation at its edge can be we reduced.

Third Embodiment

The third embodiment of the present invention will be described with reference to FIG. 6.

Figure 6:
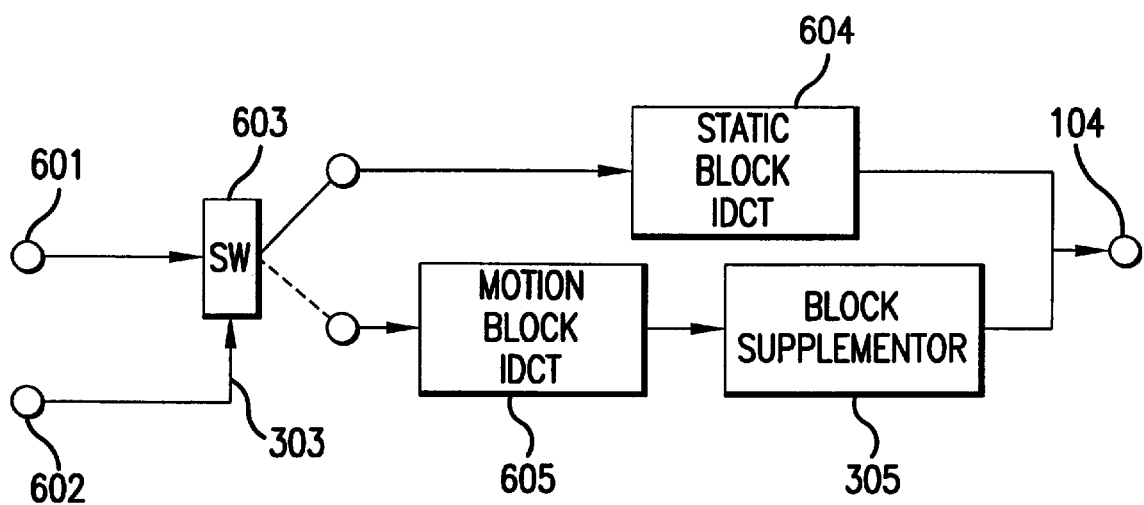
FIG. 6 is a block diagram representation of a system of a third embodiment of the present invention.

Referring to FIG. 6, there are a block compressed image data input node 601, a motion information input node 602, a switch 603, a static block IDCT 604 and a motion block IDCT 605. The rest of the modules are the same as the modules referenced above with the same numerals.

Compressed image data from the compressed image data input node 601 and motion information 303 from the motion information input node 602 are supplied to the switch 603. If the motion information 303 is "0", the compressed image data is switched to the static block IDCT 604 and processed with the two dimensional frame DCT. If the motion information 303 is "1", the compressed image data is switched to the motion block IDCT 605 and processed with the three dimensional plane-temporal DCT. The processed motion block data is supplied to the block supplementor 305 and supplementation of the interlaced field occurs by the same method as in the second embodiment. The output data from the static block IDCT 604 or the block supplementor 305 is output as static image via the image data output node 104.

As shown above, according to this embodiment, if input data is as compressed data, the present invention can be applied by using the static block IDCT and the motion block IDCT.

This third embodiment of the present invention is also advantageous for capturing and displaying data of motion objects as a static image.

Fourth Embodiment

The fourth embodiment of the present invention will be described with reference to FIG. 7 and FIG. 8.

Figure 7:
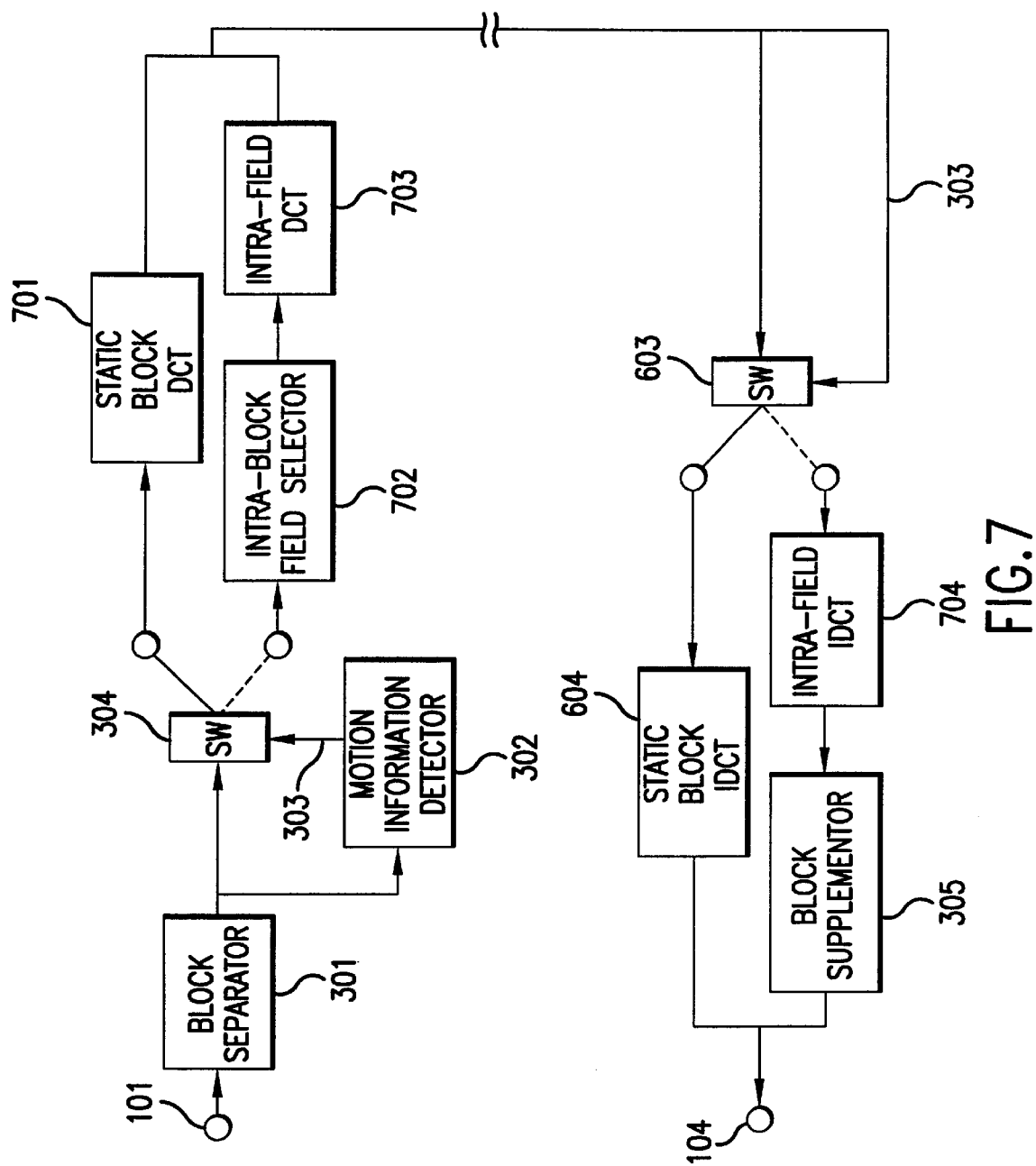
FIG. 7 is a block diagram representation of a system of a fourth embodiment of the present invention.
Figure 8:
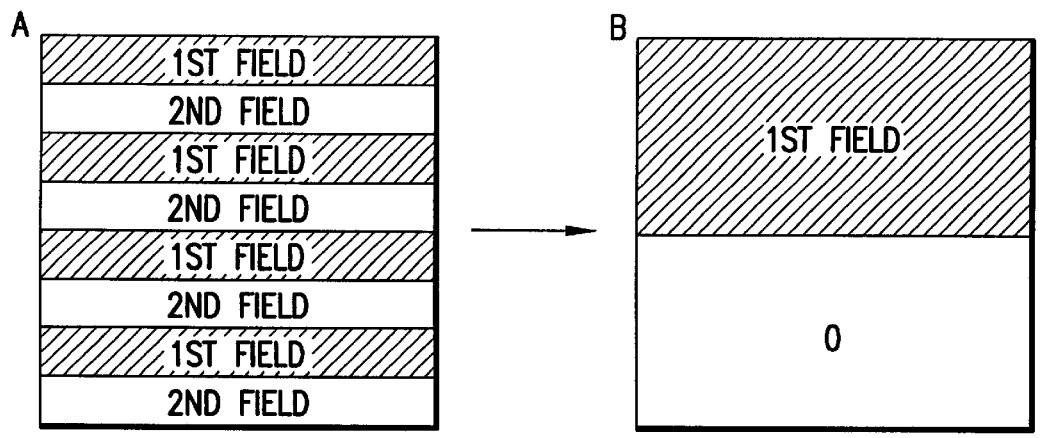
FIG. 8 shows one example process of a field selector 702 of the fourth embodiment of the present invention.

Referring first to FIG. 7, there are a static block DCT 701, a field selector 702, an intra-field DCT 703 and an intra-field IDCT 704. The rest of the modules are the same as the modules referenced above with the same numerals.

Inputted image data is separated into blocks by the block seperator 301, In the case of static block data, the block data is switched to the static block DCT 701 and transformed by the two-dimensional frame DCT. In case of motion block data, the block data is switched to the field seperator 702. FIG. 8A shows a block data configuration supplied to the field selector 702. For example, the field seperator 702 selects the first field only, nullifies the second field, processes the input data as shown in FIG. 8B, and supplies the processed data to the intra-field DCT 703. The intra-field DCT 703 is the two dimensional DCT and processes 4*8 matrix DCT to the hatched area of FIG. 8B. The DCT coefficients calculated by the static block DCT 701 and the intra-field DCT 703 are quantized and encoded and accompanied by motion information 303. Encoded data can be storaged onto media or transferred via network.

After the encoded data, accompanied by motion information, is decoded and supplied to the switch 603, the data is switched to the static block IDCT 604 or the intra-field IDCT All 704. The intra-field IDCT 704 is the two-dimensional IDCT and processes a 4*8 matrix IDCT only to the upper 4 lines of input block data as shown in FIG. 8B, and interlaced field data is supplemented by the same method as shown in FIG. 5B.

As shown above, according to this embodiment, in the case of a motion block, only one side field is selected by the field selector 702. Therefore, the motion components between two fields in the motion block are eliminated, and image data is displayed as a static image without deformation. Furthermore, the total amount of the available bits allocated for encoding per each block will be expanded compared to the case using both fields. Therefore, display quality will be better.

This fourth embodiment of the present invention is especially advantageous for an apparatus such as a digital still camera for capturing, storing or transferring data of motion objects as a static image.

Fifth Embodiment

The fifth embodiment of the present invention will be described with reference to FIG. 9.

Figure 9:
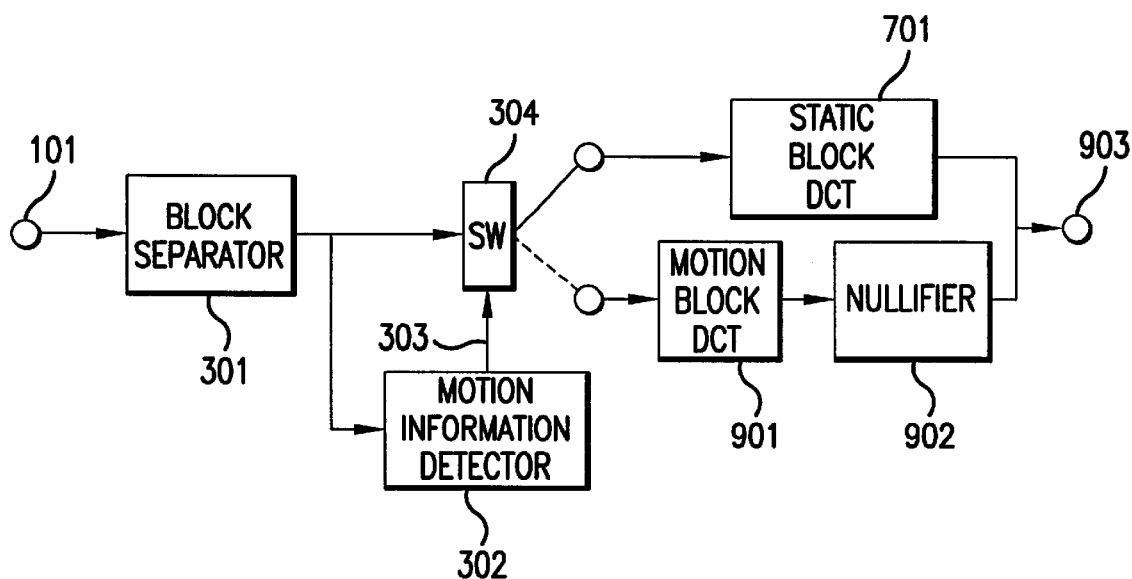
FIG. 9 is a block diagram representation of a system of a fifth embodiment of the present invention.
Figure 10:
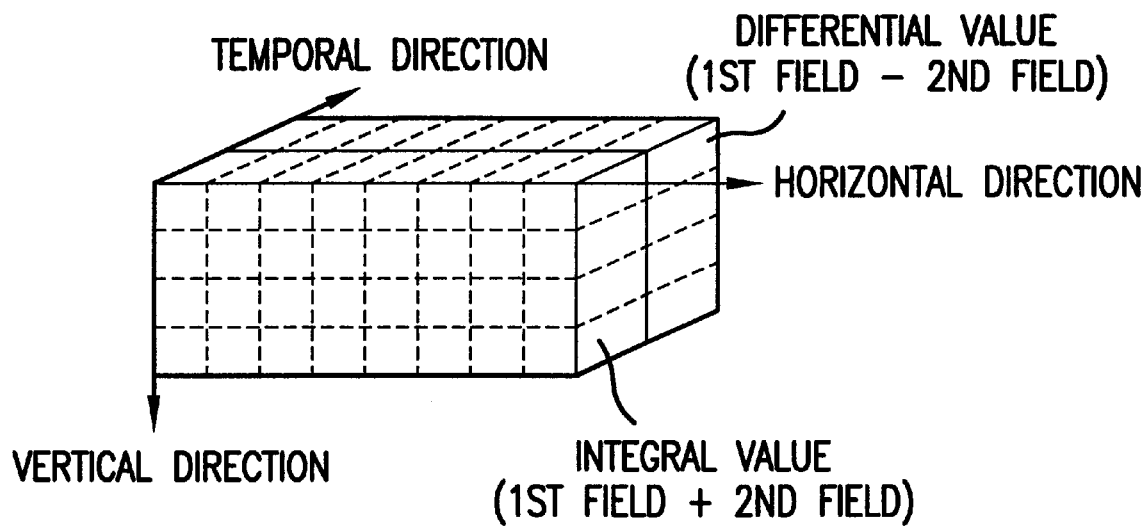
FIG. 10 shows a pixel layout in a block of a motion block DCT 901 of the fifth embodiment of the present invention.

Referring to FIG. 9, there are a motion block DCT 901, a nullifier 902 and a compressed image data output node 903 and the rest of the modules are the same as the modules referenced above with the same numerals.

Figure 11:
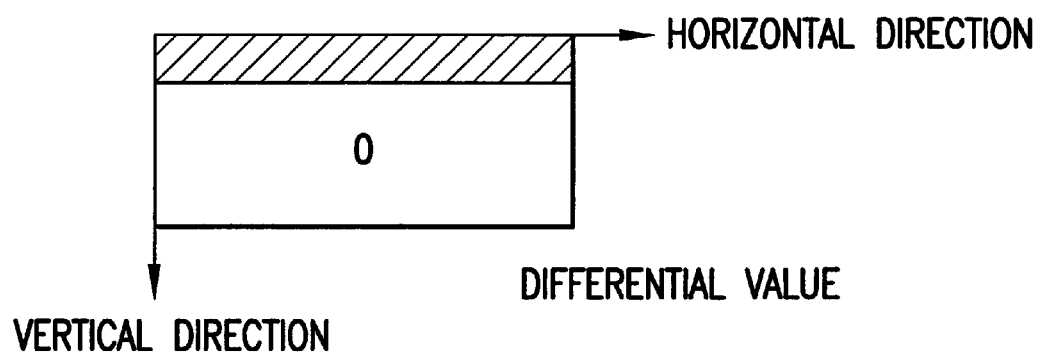
FIG. 11 shows one example process of a nullifier 902 of the fifth embodiment of the present invention.

Inputted image data is separated into blocks by the block seperator 301, the separated block data is switched to the static block DCT 701 or to the motion block DCT 901 by the switch 304 depending on the accompanying motion information. In the case of static block data, the block data is switched to the static block DCT 701, whereas in the case of motion block data, the block data is switched to the motion block DCT 901. The static block data is transformed with the two-dimensional frame DCT by the static block DCT 701 and supplied to the compressed image data output node 903. In case of the motion block data, the integral value (first field pixel+second field pixel) and the differential value (first field pixel−second field pixel) of each set of corresponding pixels between first field and second field are calculated, and the integral value and the differential value are transformed by the two dimensional 4*8 matrix DCT independently. The nullifier 902 nullifies high frequency vertical components of the DCT coefficients of the differential value supplied from the motion block DCT 901 as shown in FIG. 11, and then supplies processed data to the compressed image data output node 903.

The differential value between the two fields represents the amount of temporal change of each pixel. The motion components can be eliminated by nullifying the differential value, and the deformation seen in the edge of an image can be reduced when the image is displayed as a static image. Furthermore, more bits can be allotted to the integral value of the two fields, which is important from the viewpoint of a person's sense of sight, by reducing the bits allocated to the differential value of the two fields. Therefore, display quality will be improved.

As shown above, according to this embodiment, for the case of encoding the block data of motion objects, decoded data can be displayed as a static image with less deformation.

Sixth Embodiment

The sixth embodiment of the present invention will be described with reference to FIG. 12.

Figure 12:
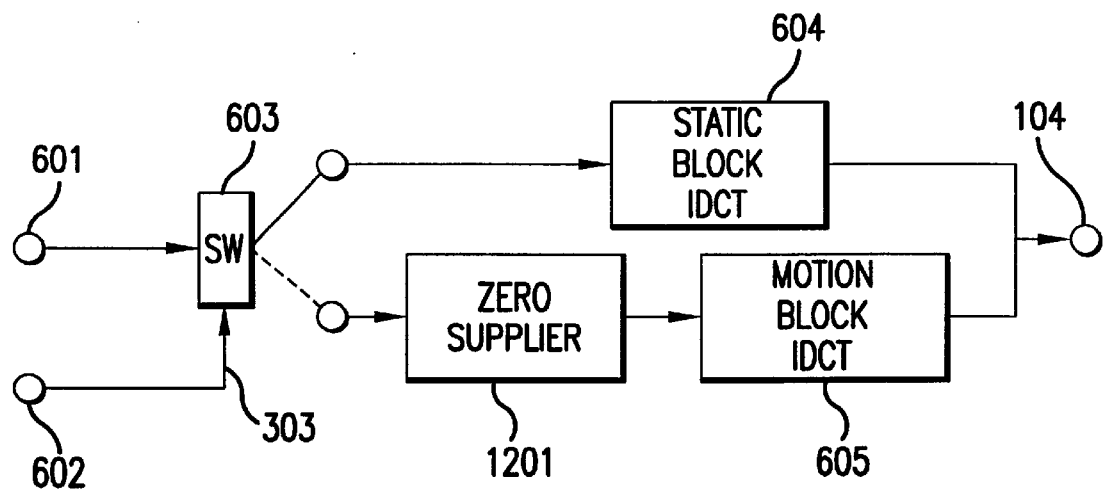
FIG. 12 is a block diagram representation of a system of a sixth embodiment of the present invention.

Referring to FIG. 12, there is a nullifier 1201 and the rest of modules are the same as the modules referenced above with the same numerals.

Compressed image data from the compressed image data input node 601 and motion information 303 from the motion information input node 602 are supplied to the switch 603. The supplied data are switched to the static block IDCT 604 or to the nullifier 1201 by the switch 603 depending on accompanying motion information. In the case of static block data, data is transformed with the two-dimensional frame IDCT by the static block IDCT 604. In the case of motion block data, the data is supplied to the nullifier 1201. The nullifier 1201 nullifies coefficients of high frequency vertical components (of the differential value of two fields). For example, all coefficients of high frequency vertical components are nullified by the nullifier 1201, then block data is transformed with the three-dimensional plane-temporal IDCT by the motion block IDCT 605.

The output image data from the static block IDCT 604 and the motion block IDCT 605 are supplied to the image data output node 104 and displayed as a static image.

As shown above, according to this embodiment, the temporal-based components of the motion block are eliminated at the decoding process, and the data can be displayed as a static image with less deformation.

Seventh Embodiment

The seventh embodiment of the present invention will be described with reference to FIG. 13.

Figure 13:
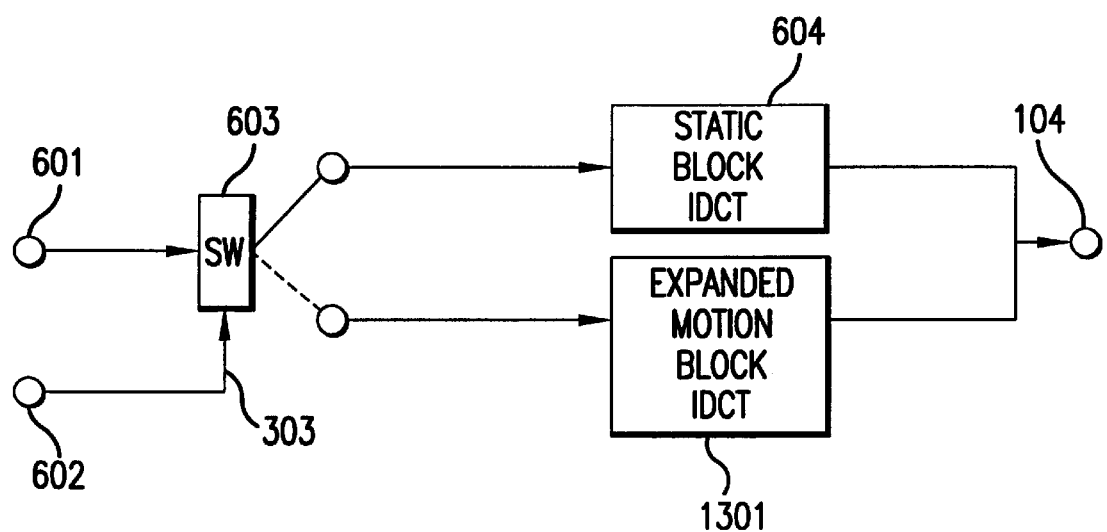
FIG. 13 is a block diagram representation of a system of a seventh embodiment of the present invention.

Referring to FIG. 13, there is an expanded motion block IDCT. The remaining modules are the same as the modules referenced above with the same numerals.

Compressed image data from the compressed image data input node 601 and motion information 303 from the motion information input node 602 are supplied to the switch 603. The supplied data are switched to the static block IDCT 604 or to the expanded motion IDCT 1301 by the switch 603, depending on the accompanying motion information.

The output image data from the static block IDCT 604 and the expanded motion block IDCT 1301 are supplied to the image data output node 104 and displayed as a static image.

The functions of the expanded motion block IDCT 1301 will be described with reference to FIG. 14 and FIG. 15 as follows.

Figure 14:
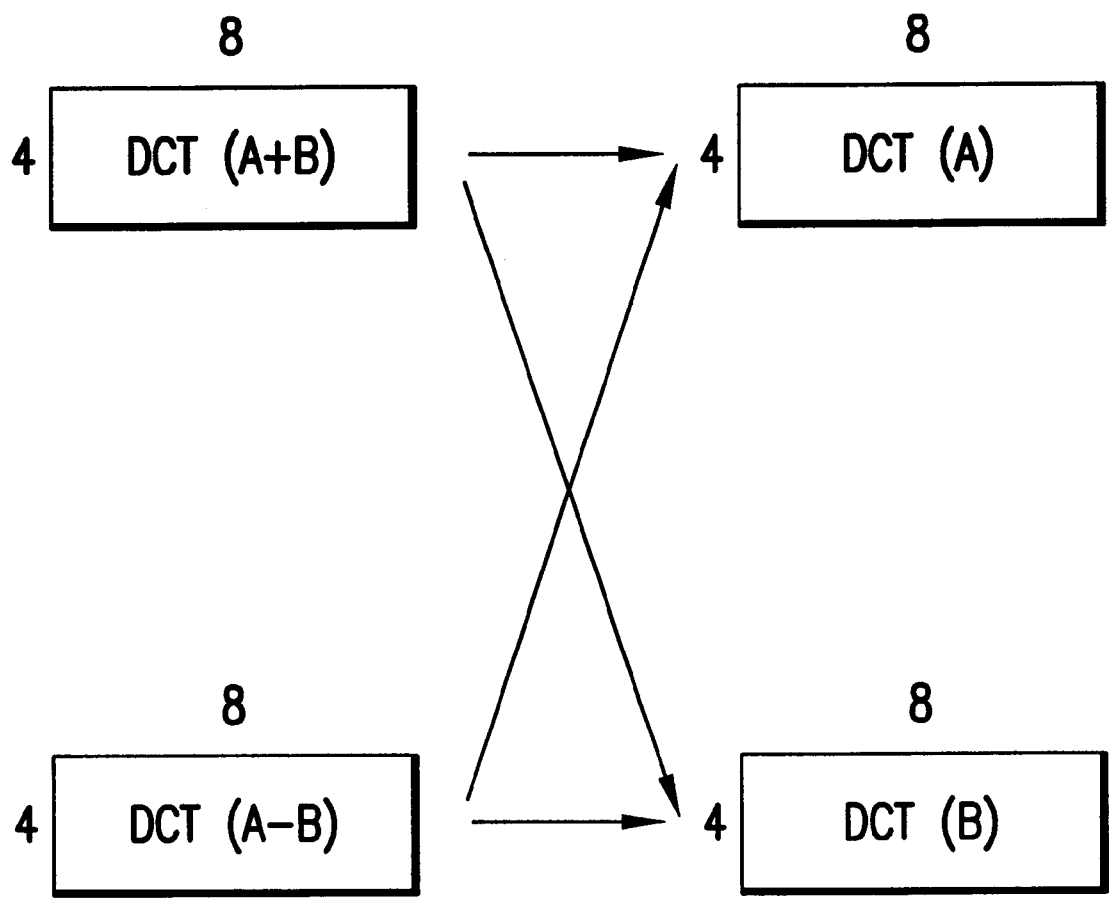
FIG. 14 shows one example process of an expanded motion block Inverse DCT (IDCT) 1301 of the seventh embodiment of the present invention.
Figure 15:
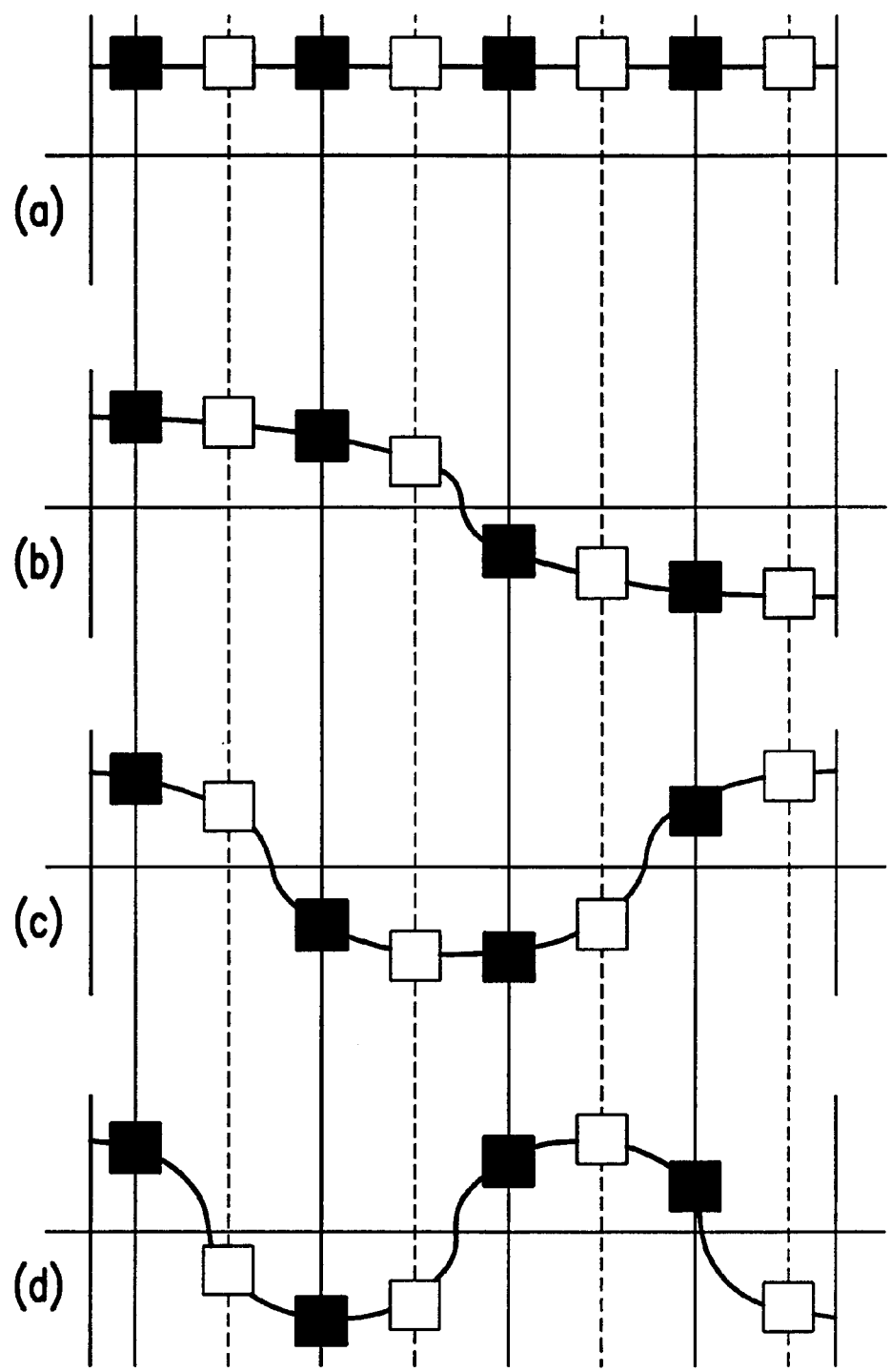
FIG. 15 shows one example process of sample points selection of the expanded motion block IDCT 1301.

Referring to FIG. 14, A and B are matrices of pixel data. The data of A is from the first field, and the data of B is from the second field. DCT(X) means that matrix X is transformed by the DCT.

As explained for the fifth embodiment, in the case of a motion block, the integral value and the differential value of the first field pixel and the second field pixel are transformed with the DCT in the encoding process. Therefore, DCT(A+B) and DCT(A−B) are supplied to the expanded motion block IDCT 1301. The DCT has linearity. Therefore, DCT(A) and DCT(B) can be calculated by the following equations.

DCT(A)=(DCT(A+B)+DCT(A−B))/2

DCT(B)=(DCT(A+B)−DCT(A−B))/2

Next, the method for reproducing 8*8 pixel data from DCT(A) in which A is a 4*8 order matrix of data will be explained as follows.

The IDCT is a way to obtain pixel data by superposing fundamental waveform signals with weighting at each sample point.

In this case, DCT(A) has the eighth order in the rows of the matrix. Therefore, 8 pixel data can be obtained by superposing 8 fundamental waveform signals at 8 sample points. On the other hand, DCT(A) has the fourth order in the columns of the matrix. Therefore, there are 4 fundamental waveform signals at 4 sample points. Conventionally, only 4 pixel data are obtained by the IDCT calculation by superposing 4 fundamental waveform signals as shown in FIGS. 15(a) to 15(d) at 4 sample points, which are shown as black square dots in FIG. 15(a) to 15(d).

In this embodiment, 4 new supplemental sample points, which are shown as white square dots in FIG. 15(a) to 15(d) are added. Therefore, 8 pixel data can be obtained by superposing 4 fundamental waveform signals at 8 sample points.

As the obtained 8*8 pixel block data is calculated based on one side field data, and no temporal-based component is included in the data.

As shown above, according to this embodiment, the temporal-based components of the motion block are eliminated in the decoding process by using one side field data only, and the data can be displayed as a static image with less deformation.

In the above embodiment, the supplied compressed data are the DCT(A+B) and the DCT (A−B), and it is preferable that the supplied compressed data be the DCT(A) or the DCT(B). In this case, either DCT(A) or DCT(B) is supplied to the expanded motion block IDCT 1301 directly and can be applied to the IDCT by the same process shown in this embodiment.

Eighth Embodiment

The eighth embodiment of the present invention will be described with reference to FIG. 16.

Figure 16:
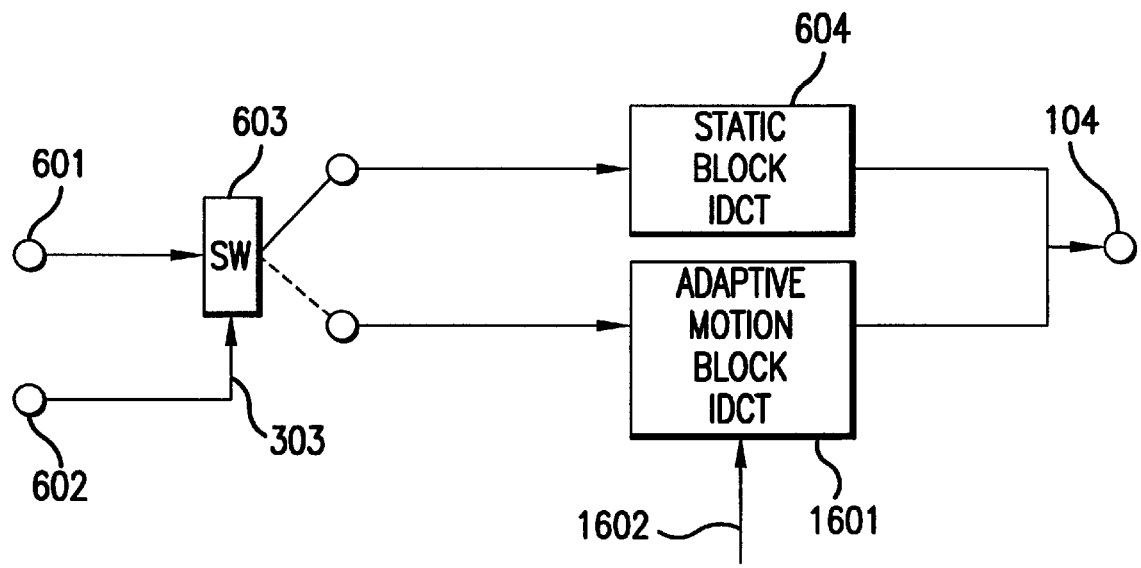
FIG. 16 is a block diagram representation of a system of a eighth embodiment of the present invention.

Referring to FIG. 16, there are an adaptive motion block IDCT1601 and a playback type information 1602. The rest of the modules are the same as the modules referenced above with the same numerals. The playback type information 1602 is information which specifies that the output image should be as a static image or as a motion picture.

Compressed image data from the compressed image data input node 601 and motion information 303 from the motion information input node 602 are supplied to the switch 603. The supplied data are switched to the static block IDCT 604 or to the adaptive motion IDCT 1601 by the switch 603, depending on accompanying motion information. If data are static block data, data are switched to the static block IDCT 604 and processed with the inverse two-dimensional plane DCT. If data are motion block data, data are switched to the adaptive motion block IDCT 1601. The playback type information 1602 is also supplied to the adaptive motion block IDCT 1601. The playback type information 1602 is a kind of flag bit, for example, a "0" which specifies that the data is to be played back as motion pictures, or a "1" which specifies that the data is to be played back as a static image.

The supplied motion block data is processed with the proper IDCT depending on the playback type information 1602 in the adaptive motion block IDCT 1601.

The obtained data from the static block IDCT 604 or the adaptive motion block IDCT 1601 are displayed via the image data output node 104.

Figure 17:
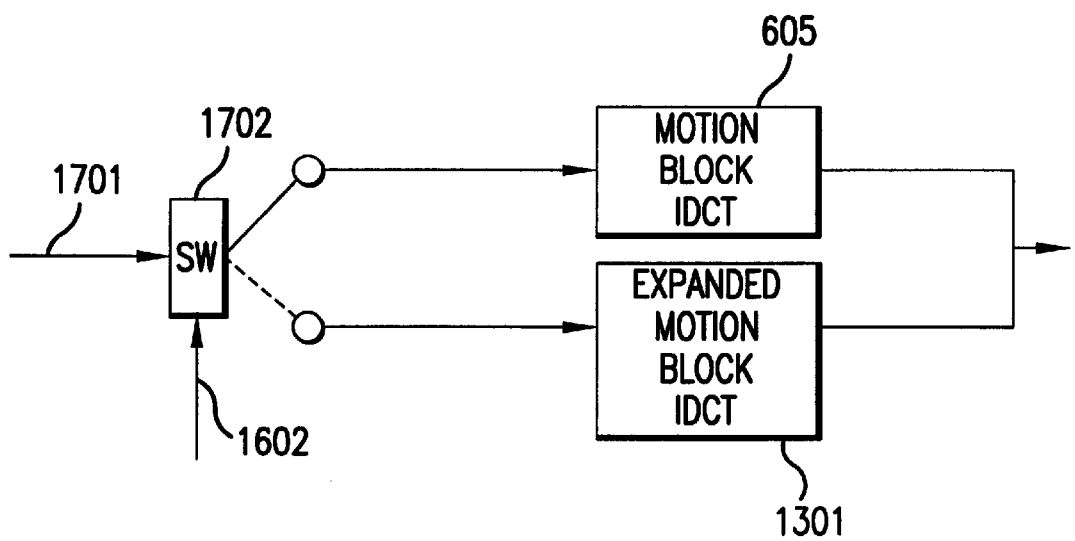
FIG. 17 shows one example process of an adaptive motion block IDCT 1601 of the eighth embodiment of the present invention.

FIG. 17 shows a detailed configuration of the adaptive motion block IDCT 1601. Referring to FIG. 17, there are an input data 1701 compressed with the DCT, and a switch 1702. The rest of the modules are the same as the modules referenced above with the same numerals.

The DCT compressed motion block data 1701 is supplied to the switch 1702. In the case that the playback information 1602 is "0", data is switched to the motion block IDCT 605, whereas in the case that the playback information 1602 is "1", data is switched to the expanded motion block IDCT 1301. At the motion block IDCT 605, the conventional three-dimension spatial-temporal IDCT is applied to the supplied data and data are processed as motion pictures. The function of the expanded motion block IDCT 1301 is the same as the function explained above for the seventh embodiment. Therefore, data also can be displayed as a static image with less deformation.

As shown above, according to this embodiment, data can be displayed as either motion pictures or a static image with less deformation by selecting the DCT to be applied to motion block data depending on the playback type information.

Ninth Embodiment

Figure 18:
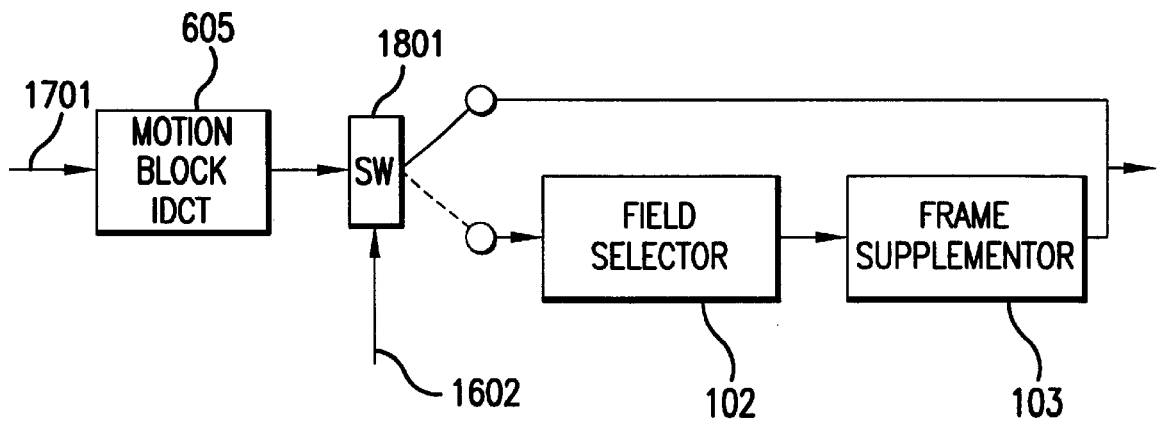
FIG. 18 is a block diagram representation of one configuration of the adaptive motion block IDCT 1601.

The ninth embodiment of the present invention will be described with reference to FIG. 16 and FIG. 18. This embodiment describes a modified configuration of the adaptive motion block IDCT 1601 which was described above in the eighth embodiment. FIG. 18 shows the modified configuration of the adaptive motion block IDCT 1601 of this embodiment. Referring to FIG. 18, there is a switch 1801. The rest of the modules are the same as the modules referenced above with the same numerals.

The DCT compressed motion block data 1701 is processed with the IDCT by the motion block IDCT 605, and then supplied to the switch 1801. In the case that the playback type information 1602 is "0", the switch 1801 switches data to the output node 104 directly. On the other hand, in the case that the playback type information 1602 is "1", the switch 1801 switches data to the field selector 102. For example, the first field data is selected by the field selector 102, interlaced data are supplemented by the frame supplementor 103, and processed data are output to the output node 104. The above series of processes are the same as described above in the first embodiment.

As shown above, according to this embodiment, data can be displayed as either motion pictures or a static image with less deformation by selecting the DCT to be applied to motion block data depending on the playback type information.

The playback type information may be either added data to the input compressed data or data supplied from outside.

In the description of the first embodiment, input data are described as non-compressed data. If compressed data is supplied as input data, the system can be modified to the same configuration as the third embodiment by adding the static block IDCT and the motion block IDCT.

In the description thus far for all embodiments, when selecting one side field data, the first field was selected. However, the same effect could be obtained by selecting the second field data instead of the first field data.

Also in the description thus far for all embodiments, in the case of supplementing the interlaced field, data can be reproduced and supplemented based on the distant field data instead of the contingent field data. However the sampling method for the data supplementation is not limited to the method described in the embodiments.

The process of the present invention can be described in the form of a computer program, and the present invention can be applied to other systems by installing and copying the program via recording media such as a flexible disk.

Figure 19:
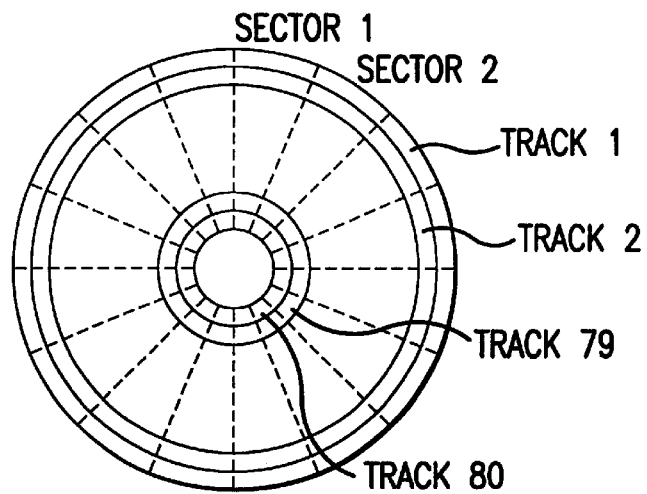
FIG. 19 shows a physical format of a flexible disk.
Figure 20A:
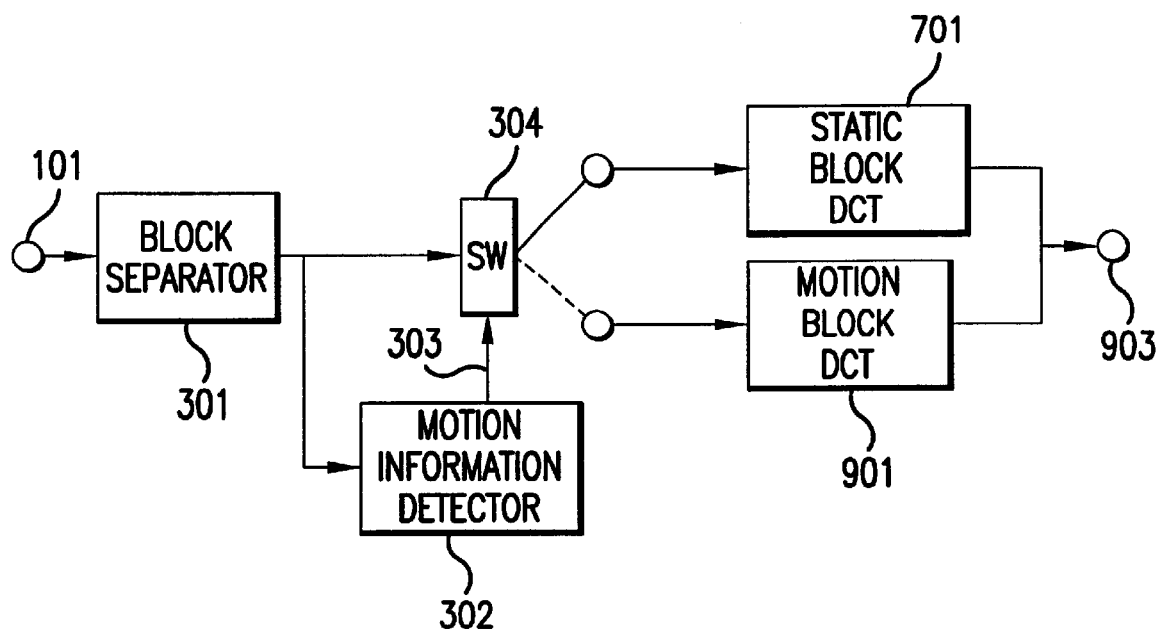
FIG. 20A is a block diagram representation of an image data compression process of a conventional system.
Figure 20B:
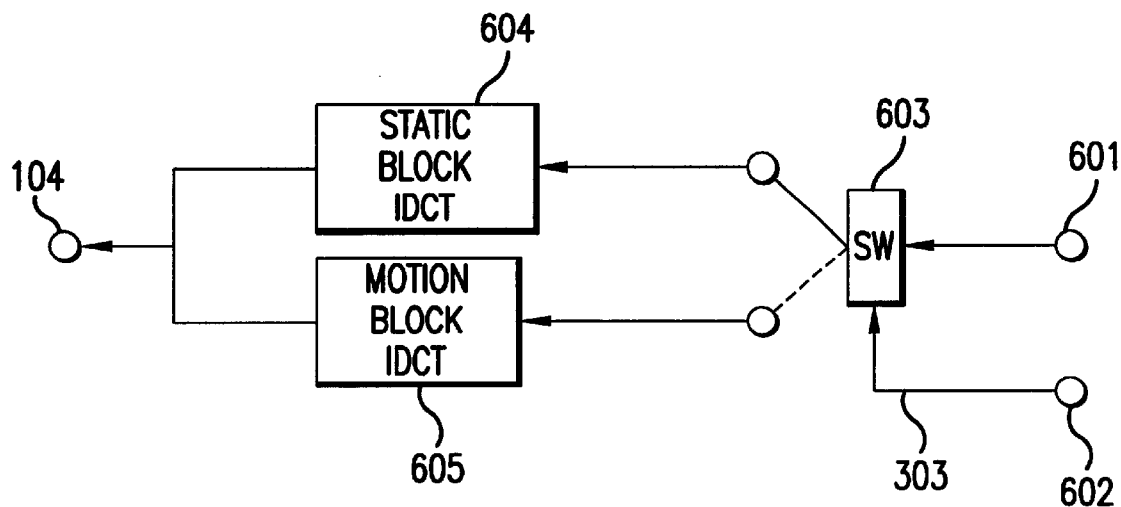
FIG. 20B is a block diagram representation of an image data decompression process of a conventional system.
Figure 21:
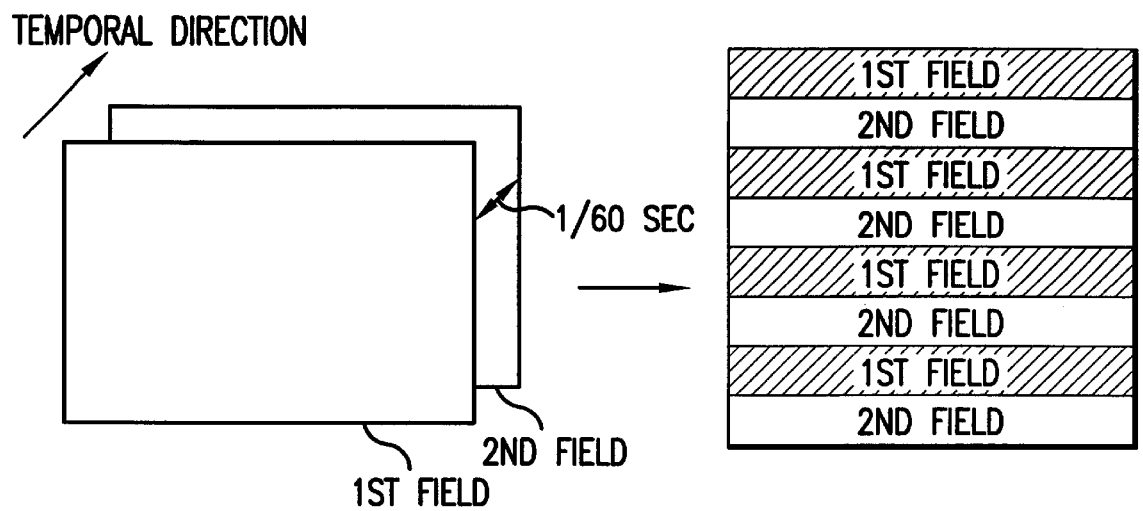
FIG. 21 shows a block composition of interlace-scanned image data.
Figure 22:
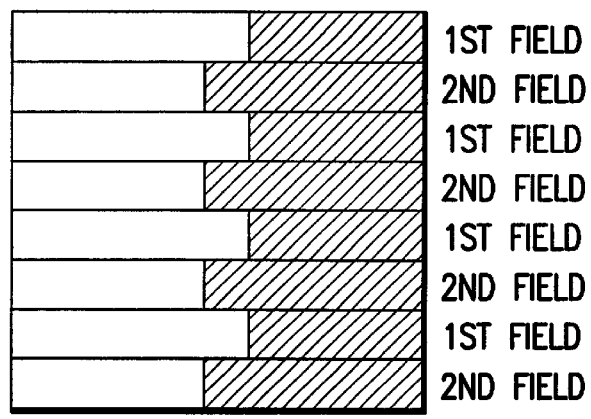
FIG. 22 shows a composited static image of objects with rapid motion.

FIG. 19 is a conceptual diagram representation of a physical format of a flexible disk. There are tracks in concentric circles and tracks are divided into 16 sectors of constant angular extent. A program is stored in an allocated area. The flexible disk can be protected from dust and unexpected external forces by being stored in a chassis. Computer systems can read and write programs and data from the flexible disk via a flexible disk drive. The flexible disk can be inserted into, and ejected by, a slot of the flexible disk drive. For program writing, data to be written are transmitted from the computer system to the flexible disk, and for program reading, data to be read are transmitted from a flexible disk to the computer system.

In accordance with the above description, a magneto-optical disk can be used instead of the flexible disk. Furthermore, any recordable media such as an IC memory card can be used as a program storage media. Moreover, the program can be transmitted via computer network without any portable storage media.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. An image signal processing apparatus for data processing for static image display in which input image data is accompanied by inter-field motion information, comprising:

means for compositing a static frame image by supplementing field data of the input image data based on neighboring field data of the input image data;

means for controlling the compositing means according to the inter-field motion information;

a block separator which lines the field data of the input image data serially and separates the lined data into blocks;

a motion information detector which calculates a differential value between fields and outputs motion information which indicates the block data as a motion block if the differential value is larger than a set value or as a static block if the differential value is not larger than the set value; and a switch which switches destination of the block data according to the output of the motion information from the motion detector.

2. An image signal processing apparatus for processing input data for static image display, comprising:

means for obtaining inter-field motion information of the input data;

means for controlling an orthogonal transformation for compressing the processed input data corresponding to the obtained inter-field motion information;

means for controlling an inverse orthogonal transformation for decompressing the compressed data corresponding to the obtained inter-field motion information; and means for compositing a static frame image based on the decompressed data as one frame of static image data.

3. The image signal processing apparatus according to claim 2, wherein the inter-field motion information is defined by a block data, and when an inter-field differential value of the block is larger than a predetermined value, the block is regarded as a "motion block", and when the inter-field differential value of the block is not larger than the predetermined value, the block is regarded as a "static block".

4. An image signal processing apparatus for processing input image data for static image displaying, comprising means for detecting whether input block separated image data is motion block data;

means for calculating an integral value of two fields of the image data and a differential value of the two fields if the inputted block separated data is detected as motion block data; and means for compressing inputted image data by applying an orthogonal transformation to the differential value for nullifying high frequency components.

5. An image signal processing apparatus for data processing for static image display in which input image data is compressed, comprising:

means for accompanying the input image data with inter-field block motion information;

means for decompressing the input image data according to the inter-field block motion information, wherein said block motion information is a flag bit data for indicating whether a block is a motion block or a static block;

wherein the inter-field block motion information is the flag bit data for indicating whether the input block data is a motion block data or a static block data detected upon block seperation and data compression of the input image data; and wherein the means for decompressing is a three-dimensional spatial-temporal inverse orthogonal transformation applied to the motion block data with supplementation zero to the high frequency components.

6. An image signal processing apparatus for processing image data for static image display, comprising means for inputting both compressed image data accompanied by inter-field motion information and playback type information which indicates playback type of output image as motion picture or as static image;

means for switching destination of the compressed image data according to the inter-field motion information; and means or applying an inverse transformation to the compressed image data for decompression according to the playback type information.

7. The image signal processing apparatus according to claim 6, wherein the inter-field motion information indicates if the input data is motion block data or static block data detected upon block seperation and data compression of the input image data.

8. The image signal processing apparatus according to claim 6, wherein the inter-field motion information indicates if the input data is motion block data or static block data detected upon block seperation and data compression of the input image data, and wherein the means for decompression applies a conventional three-dimensional spatial-temporal inverse orthogonal transformation to the motion block data if the playback type information indicates motion picture, and applies a spatial inverse orthogonal transformation to one side field data of two fields of data of the motion block data if the playback type information indicates static image and composes one frame static image by supplementing the other field data from decompressed field data.

9. The image signal processing apparatus according to claim 6, wherein the inter-field motion information indicates if the input block data is motion block data or a static block data detected upon block seperation and data compression of the input image data, and wherein the means for applying a conventional three-dimentional spatial-temporal inverse orthogonal transformation to the motion block data if the playback type information is motion picture, and applies a conventional three-dimentional spatial-temporal inverse orthogonal transformation to the motion block data if the playback type information is static image and composes one frame image from one side field data of two fields of data of decompressed image data by supplementing the other field data.

10. An image signal processing method for data processing for static image display, comprising the steps of:

obtaining an inter-field motion information of input data;

controlling an orthogonal transformation for compressing the processed input data corresponding to the obtained inter-field motion information;

controlling an inverse orthogonal transformation for decompressing the compressed data corresponding to the obtained inter-field motion information; and compositing a static frame image based on the decompressed data as one frame of static image data.

11. The image signal processing method according to claim 10, wherein the inter-field motion information is defined by a block data, and when an inter-field differential value of the block is larger than a predetermined value, the block is regarded as a "motion block", and when the inter-field differential value of the block is not larger than the predetermined value, the block is regarded as a "static block".

12. An image signal processing method for data processing for static image display comprising detecting whether an inputted block separated image data is motion block data or not;

calculating an integral value of two fields of the image data and a diffential value of the two fields if the inputted block separated data is detected as motion block data; and compressing the inputted image data by applying an orthogonal transformation to the differential value for nullifying high frequency components.

13. An image signal processing method for data processing for static image display in which input image data is compressed data and accompanied by inter-field block motion information, comprising the steps of;

inputting the compressed data and the inter-field block motion information;

decompressing the input image data according to the inter-field block motion information;

wherein said block motion information is a flag bit data for indicating a block as a motion block or as a static block;

wherein the inter-field block motion information is the flag bit data for indicating whether the input block data is a motion block data or a static block data detected upon block seperation and data compression of the input image data; and wherein the decompressing comprises applying three-dimentional spatial-temporal inverse orthogonal transforming to the motion block data with supplementing zero to the high frequency components.

14. An image signal processing method for data processing for static image display comprising inputting both compressed image data accompanied by inter-field motion information and playback type information which indicates playback type of output image as motion picture or as static image;

switching destination of the compressed image data according to the inter-field motion information; and applying an inverse transformation to the compressed image data for decompressing according to the playback type information.

15. The image signal processing method according to claim 14, wherein the inter-field motion information indicates whether the input data is motion block data or static block data detected upon block separation and data compression of the input image data.

16. The image signal processing method according to claim 14, wherein the inter-field motion information indicates whether the input data is motion block data or static block data detected upon block separation and compression of the input image data, and wherein the decompressing applies a conventional three-dimensional spatial-temporal inverse orthogonal transformation to the motion block data if the playback type information is motion picture, and applies a spatial inverse orthogonal transformation to one side field data of the motion block data if the playback type information is static image and composes one frame static image by supplementing other field data from decompressed field data.

17. The image signal processing method according to claim 14, wherein the inter-field motion information indicates whether the input data is motion block data or static block data detected upon block separation and compression of the input image data, and wherein the decompressing applies a conventional three-dimentional spatial-temporal inverse orthogonal transformation to the motion block data if the playback type information is motion picture, and applies the conventional three dimension spatial-temporal inverse orthogonal transformation to the motion block data if the playback type information is static image and composes one frame image from one side of field data of two fields of data of decompressed image data by supplementing the other field data.

18. An image signal processing method for data processing input data for static image display in which input image data is accompanied by inter-field motion information, comprising:

compositing a static frame image by supplementing field data based on neighboring field data of the input image data;

controlling applying the compositing for the data display according to the inter-field motion information;

lining the field data of the input image data in serially and separating the lined data into block data;

calculating a differential value between the field data and outputing the motion information to indicate whether the block data is a motion block if the differential value is larger than a set value or as a static block if the differential value is not larger than the set value; and switching destination of the block data according to the motion information.

* * * * *